(12) United States Patent  (10) Patent No.: US 7,770,020 B2
Shirasaka et al.  (45) Date of Patent: Aug. 3, 2010

(54) FACE IMAGE OBTAINING METHOD AND APPARATUS

(75) Inventors: Hajime Shirasaka, Kanagawa-ken (JP); Kazuhiro Mino, Kanagawa-ken (JP)

(73) Assignee: Fujifilm Corporation (JP)

( * ) Notice: Subject to any disclaimer, the term of this patent is extended or adjusted under 35 U.S.C. 154(b) by 965 days.

(21) Appl. No.: 11/528,548

(22) Filed: Sep. 28, 2006

(65) Prior Publication Data

US 2007/0074042 A1  Mar. 29, 2007

(30) Foreign Application Priority Data

Sep. 28, 2005  (JP)  ............... 2005-281367

(51) Int. Cl.
*H04L 9/00* (2006.01)
*H04L 9/32* (2006.01)

(52) U.S. Cl. .......................... 713/186; 726/2
(58) Field of Classification Search ................. 713/186, 713/182; 382/115–118, 124; 726/2–5, 16–19
See application file for complete search history.

(56) References Cited

U.S. PATENT DOCUMENTS 6,980,669 B1 * 12/2005 Uchida ................. 382/115

2003/0191949 A1 * 10/2003 Odagawa ................. 713/186

FOREIGN PATENT DOCUMENTS

JP  2005-141429 A  6/2005
WO  WO 2005/050508 A1  6/2005

* cited by examiner

*Primary Examiner*—Hosuk Song
(74) *Attorney, Agent, or Firm*—Studebaker & Brackett PC; Donald R. Studebaker

(57) ABSTRACT

A face image obtaining apparatus which includes: a biological information preliminarily obtaining means for preliminarily obtaining biological information of a user; a biological information determining means for determining whether the biological information obtained by the biological information preliminarily obtaining means is applicable to biometric authentication; a biological information storing means for storing the biological information as biometric authentication information if the biological information is determined to be applicable to biometric authentication by the biological information determining means; an input means for obtaining biological information of the user through inputting action of the user for obtaining a face image of the user; and a face image obtaining and storing means. The face image obtaining and storing means obtains and stores the face image of the user if the biological information obtained through the inputting action of the user matches the biometric authentication information.

6 Claims, 5 Drawing Sheets

FACE IMAGE OBTAINING METHOD AND APPARATUS

BACKGROUND OF THE INVENTION

1. Field of the Invention

The present invention relates to a face image obtaining apparatus for obtaining a face image to be attached to a personal paper or the like belonging to an individual, in particular, ID card, magnetic card, or the like. More specifically, the present invention relates to a face image obtaining apparatus having hand-related biological information obtaining function, as well as providing a face image of the user.

2. Description of the Related Art

Currently, unattended face image obtaining apparatuses for providing face images of the users are installed on the street. Such apparatuses provide recorded face images to the users by printing on plain papers or stickers.

In addition, a face image obtaining apparatus capable of obtaining biological information of the user such as fingerprint and the like, as well as face image, is proposed as described, for example, in International Patent Publication No. WO2005/050508. In the apparatus disclosed in the aforementioned patent publication, a face image of the user is recorded first, then the biological information. The apparatus records monitoring photographs, including a face image of the user, before and after obtaining biological information in order to provide a proof record when the user is switched for counterfeiting purpose. Such monitoring photographs may have a deterrent effect on the counterfeiting user switching. But, it is difficult to prevent such counterfeiting user switching at the site where the biological information and face image are obtained.

In order to prevent such counterfeiting user switching, a face image obtaining apparatus in which the face image and biological information are obtained at the same time has also been considered. If, for example, a fingerprint is obtained as the biological information, it is not an easy task for the user not accustomed to taking a fingerprint to obtain a face image and a proper fingerprint applicable to fingerprint authentication at the same time. When a user initially failed to obtain a fingerprint, if reacquisition of the fingerprint is authorized, the counterfeiting user switching may not be prevented.

In the mean time, another face image obtaining apparatus is also proposed as described, for example, in International Patent Publication No. WO2005/050508. In the apparatus, biological information is obtained before a face image, and when obtaining the face image, the biological information is obtained again to verify the identity of the user.

The face image obtaining means described in Japanese Unexamined Patent Publication No. 2005-141429 may prevent the counterfeiting user switching, but has a problem that the biological information needs to be reacquired when recording the face image, which increases the burden on the user.

The present invention has been developed in view of the problem described above, and it is an object of the present invention to provide a face image obtaining apparatus capable of reliably obtaining biological information applicable to authentication, and preventing counterfeiting user switching without increasing the burden on the user.

SUMMARY OF THE INVENTION

The face image obtaining method of the present invention is a method, comprising the steps of:

preliminarily obtaining biological information of a user;

determining whether the biological information is applicable to biometric authentication;

storing the biological information as biometric authentication information if the biological information is determined to be applicable to biometric authentication;

obtaining biological information of the user through inputting action of the user for obtaining a face image thereof; and obtaining and storing the face image of the user if the biological information obtained through the inputting action of the user matches the biometric authentication information.

The face image obtaining apparatus of the present invention is an apparatus, comprising:

a biological information preliminarily obtaining means for preliminarily obtaining biological information of a user;

a biological information determining means for determining whether the biological information obtained by the biological information preliminarily obtaining means is applicable to biometric authentication;

a biological information storing means for storing the biological information as biometric authentication information if the biological information is determined to be applicable to biometric authentication by the biological information determining means;

an input means for obtaining biological information of the user through inputting action of the user for obtaining a face image thereof; and a face image obtaining and storing means for obtaining and storing a face image of the user if the biological information obtained through the inputting action of the user matches the biometric authentication information.

The referent of "biological information" as used herein means finger-related biological information, such as fingerprint, finger-vein pattern, or the like; hand-related biological information, such as palm print, palm shape, palm-vein pattern, or the like; voiceprint; or the like.

If the biological information is a fingerprint, an input means having a fingerprint obtaining function, for example, a push button or a touch panel with a fingerprint obtaining function may be used as the input means.

If the biological information is a voiceprint, an input means having a voiceprint obtaining function, for example, a voice recognition unit with a voiceprint obtaining function may be used as the input means.

In the face image obtaining method and apparatus of the present invention, the following are performed: preliminarily obtaining biological information of a user; determining whether the biological information is applicable to biometric authentication; storing the biological information as biometric authentication information if the biological information is determined to be applicable to biometric authentication; obtaining biological information of the user through inputting action of the user for obtaining a face image thereof; and obtaining and storing the face image of the user if the biological information obtained through the inputting action of the user matches the biometric authentication information. This allows biological information applicable to biometric authentication to be stored as biometric authentication information without fail. Further, simple inputting action of the user allows the face image to be obtained, and biometric authentication to be implemented when obtaining the face image. This may prevent the counterfeiting user switching without increasing the burden on the user.

DESCRIPTION OF THE PREFERRED EMBODIMENTS

Figure 1:
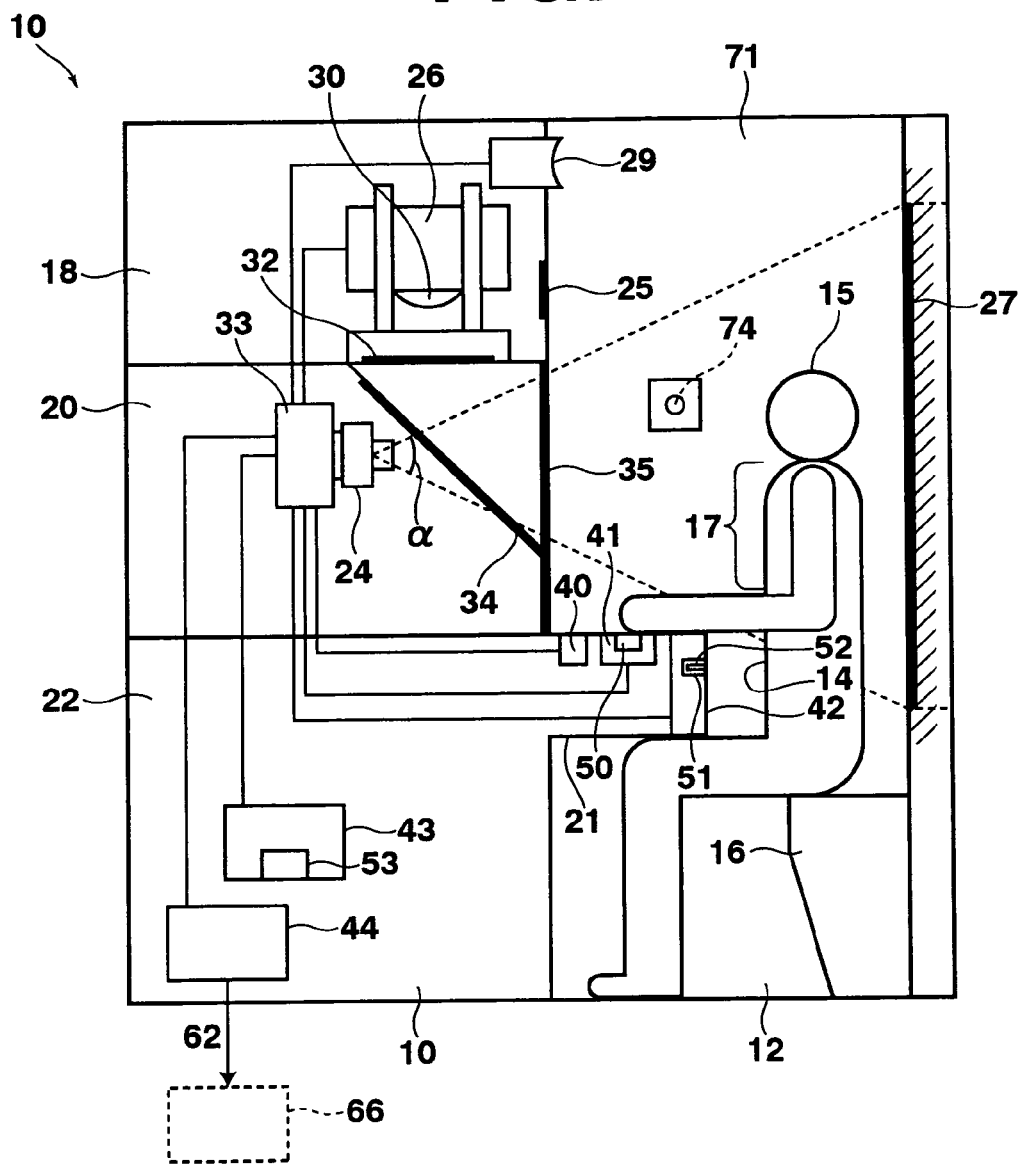
FIG. 1 is a schematic diagram of the face image obtaining apparatus according to a first embodiment of the present invention.
Figure 2:
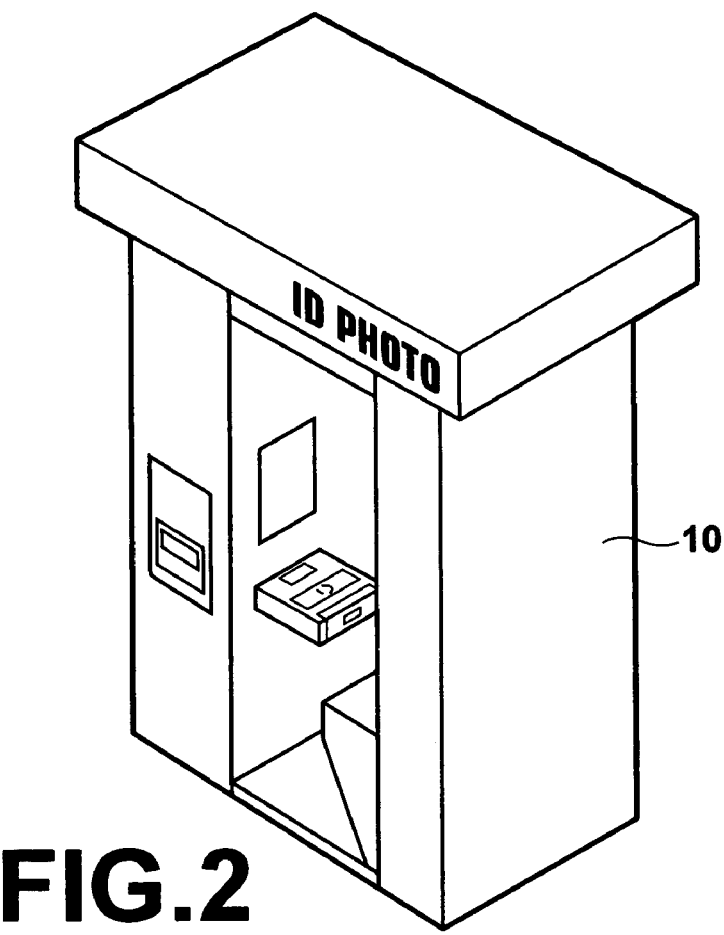
FIG. 2 is an external view of the face image obtaining apparatus shown in FIG. 1.

Hereinafter, the face image obtaining apparatus according to a first embodiment will be described with reference to the accompanying drawings. FIG. 1 is a schematic diagram of the face image obtaining apparatus 10 according to a first embodiment of the present invention. The face image obtaining apparatus 10 has a cuboid enclosure having a height of approximately 2.0 m with a width of approximately 1.4 m. An exemplary external view of the apparatus 10 is shown in FIG. 2.

As shown in FIG. 10, the face image obtaining apparatus 10 includes a user compartment 12 having a width of around 75 cm. A user 14 sits on a chair 16 in the user compartment 12 to perform image taking.

The portion of the face image obtaining apparatus 10 other than the user compartment 12 is divided into an upper section 18, middle section 20, and bottom section 22 having a desk 21. A digital camera 24 and a controller 33 are installed in the middle section 20. The controller 33 controls the overall operation of the face image obtaining apparatus 10, including control of the digital camera 24. The lens field angle α of the digital camera 24 is wide enough to cover the range from around 60 cm to around 170 cm in height on a rear wall 27 of the user compartment 12. Consequently, when the user 14 sits on the chair 16, at least a head region 15 and a chest region 17 are reliably covered, which allows image taking independent of the body height of the user 14.

A lighting unit 25, a CTR display 26, and a speaker 29 are installed in the upper section 18, which are connected to the controller 33.

The CTR display 26 is capable of displaying a motion image and a still image outputted from the controller 33. The display screen 30 of the display 26 is directed downward, and the display content is projected onto a half mirror 34 in the middle section 20 through a hollow boundary face 32 between the upper section 18 and the middle section 20.

According to the inclined half mirror 34 disposed between the camera 24 and the user 14, a portion of the light from the display 26 and the user compartment 12 is reflected to each other. A portion of the light from the user compartment 12 is transmitted through the mirror 34 and propagates to the camera 24, but the light from the side of the camera 24 is blocked and does not reach the user compartment 12. Consequently, the user 14 may view the projected content on the half mirror 34 through a glass window 35, but may not recognize the camera 24. But the camera 24 may record an image of the user 14 with the light propagated to the camera 24 from the user compartment 12 through the half mirror 34.

The lighting unit 25 is installed for illuminating the user compartment 12 to provide sufficient luminance for image taking, and the speaker 29 is installed to provide voice operation guidance to the user 14.

A fingerprint obtaining section 40, an operation touch panel 41, a card writer 42, a printer 43, and a modem 44 are provided in the bottom section 22. The fingerprint obtaining section 40, operation touch panel 41, card writer 42, printer 43, and modem 44 are connected to the controller 33. The fingerprint obtaining section 40, operation touch panel 41, and card writer 42 are accommodated in the desk 21.

The fingerprint obtaining section 40 is a semiconductor fingerprint obtaining section constructed to automatically obtain fingerprint digital data when a predetermined area of the fingerprint obtaining section 40 is touched by a finger.

Figure 3:
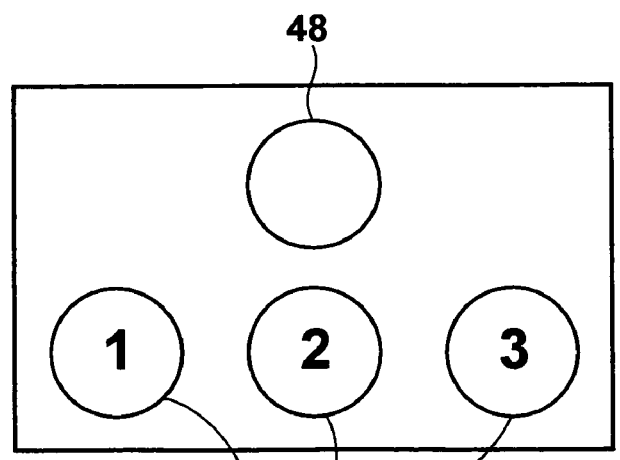
FIG. 3 is a drawing for explaining an operation entry screen.

The touch panel 41 is a device for outputting signals to the controller 33 according to the operational instruction by the user 14. The touch panel 41 is capable of displaying by switching an information entry screen in which personal data, such as the user name, resident resister code number, or passport number is inputted, or an operational instruction entry screen in which operational instruction information is inputted. A keyboard is displayed on the information entry screen, and an imaging button 48 for giving an instruction to take a face image and selection buttons 49 for selecting a face image to be recorded on a recording medium (described later) from among the obtained face images on the operational instruction entry screen as shown in FIG. 3. A semiconductor fingerprint obtaining section 50 is built in the region where the imaging button 48 of the touch panel 41 is displayed, and a fingerprint of the user is automatically obtained when the user touches the imaging button 48 only while the operational instruction entry screen is displayed.

The card writer 42 has a slot 52 for accepting a recording medium 51 provided by the user 14, and is capable of writing on the recording medium inserted therein. As for the recording medium 51, for example, flexible disk, SmartMedia™, CompactFlash™, MomoryStic™, SD (Secure Digital) MomoryCard™, xD (Extreme Digital)-PictureCard™, and the like may be used.

The card writer 42 writes the digital face image data obtained by the camera 24, and fingerprint data of the left and light forefingers obtained by the fingerprint obtaining section 40 on the recording medium 51.

The printer 43 is capable of printing the image obtained by the camera 24 as a photograph. The printed photograph is outputted from an outlet 53.

The modem 44 is a transfer means for transferring the digital image data of the face of the user to a predetermined place, for example, to a management center 66 through a communication line 62 if so requested by the user.

In FIG. 1, the inside of the upper section 18, middle section 20, and bottom section 22 is shown visible for convenience. In actuality, however, the inside is hidden by a wall and invisible to the user other than the fingerprint obtaining section 40, touch panel 41, slot 52 of the card writer, and outlet 53 of the printer 43. Further, in actuality, further mechanisms including a coin slot, a payback slot, and the like are also provided in the bottom section 22, but they are omitted in FIG. 1 for clarity.

A monitoring camera 74 for continuously recording the user 14 is provided on a side wall 71 of the apparatus 10. Preferably, for example, an infrared LED (Light Emitting Diode) camera is used as the camera 74. The monitoring camera 74 is connected to a predetermined remote place, for example, to the management center 66 through the modem 44 and communication line 62.

Figure 4:
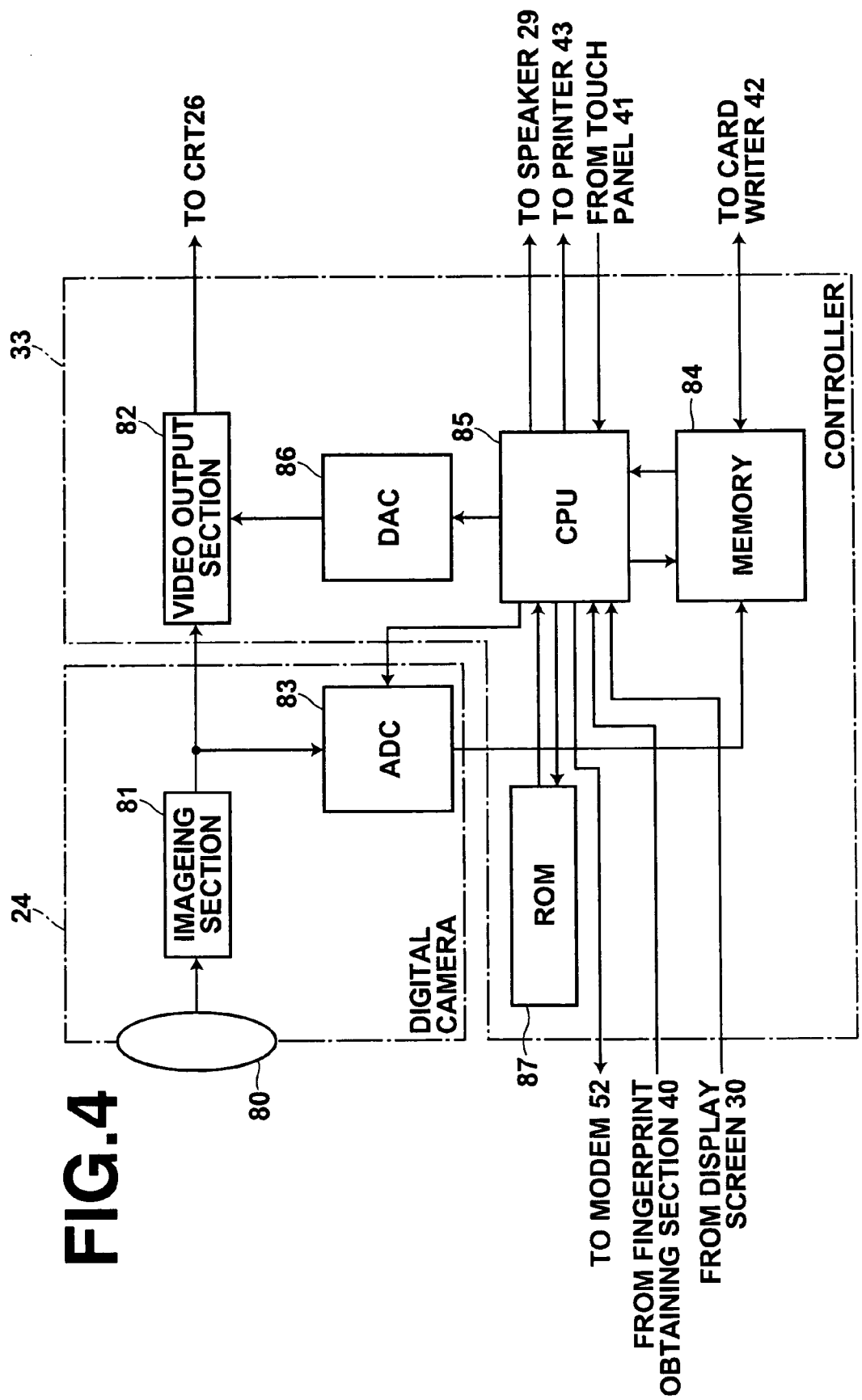
FIG. 4 is a functional block diagram of the digital camera and controller shown in FIG. 1.

FIG. 4 is a functional block diagram of the digital camera 24 and controller 33 shown in FIG. 1. An optical lens 80 focuses the image of the subject 14 on the light receiving surface of an imaging section 81 by receiving light from the subject 14. As for the imaging section 81, for example, CCD (Charge Coupled Device) may be used. Image signals photoelectrically converted by the imaging section 81 are outputted to a video output section 82.

Generally, the video output section 82 sends the image signals received from the imaging section 81 to the CRT display directly through an output terminal. Thus, the motion image of the user 14 is captured by the camera 24 and outputted, then displayed on the CRT 26, and finally reflected by the half mirror 34 to return to the user 14. Hereinafter, the returning of the motion image directly to the user in the manner as described above is referred to as video through. The user 14 may observe self motion image returned by video through in real time before image taking is performed.

The image signals outputted from the imaging section 81 may also be outputted to an A/D converter (Analog/Digital Converter, ADC) 83. When a face image is obtained, the analog image signals are converted to digital image signals, and the digital image signals are stored in a memory 84 by the ADC 83.

A CPU (Central Processing Unit) 85 is connected to the ADC 83, memory 84, and a D/A converter (Digital/Analog Converter, DAC) 86 to control them. When imaging taking is performed, the CPU 85 sends a conversion command to the ADC 83 to cause it to perform A/D conversion on the motion image on a frame basis. The CPU 85 may fetch the digital image signals digitized and stored in the memory 84 to perform various image processing, and then store them in the memory 84 again.

The CPU 85 relates the face image data of the user 14 obtained by the digital camera 24 to the personal data, for example, user name, resident resister code number, or passport number inputted from the touch panel 41. Further, the CUP 85 relates the digital image data to the fingerprint authentication data, a unique identification number of the face image obtaining apparatus 10, and date and time data of imaging.

Here, any relating method may be used. For example, a name may be attached to the face image data using the personal data. Alternatively, text data may be recorded in the header section of the digital image data, and store them in the memory 84 as a unit. By relating the personal data to the digital image data in the manner as described above, the individual to whom the digital image data belongs to may be identifies easily.

The CPU 85 may output an image processed digital still image to the DAC 86 to cause it to perform D/A conversion on the digital still image and to send the analog still image to the video output section 82. Here, the CPU 85 may control the video output section 82 to output the analog still image instead of the analog motion image returned by video through. In this way, the recorded and image processed still image may be presented to the user. Further, the analog still image signals and motion image signals may be outputted either in color or in black-and-white.

The CPU 85 may cause CRT 26 to display an image processed recorded image in freely laid out format. Further, it may also cause the CRT 26 to display a simple animation by sending a plurality of still images stored in the memory 84 in advance on a frame by frame basis, as well as outputting the recorded image. Still further, it may freely output graphics through the video output section 82, so that a message directed to the user 14 may be displayed on the CRT 26.

The CPU 85 is further connected to the speaker 29, and may output voice signals provided in advance to give appropriate operational guidance for each operation step to the user 14 in speech.

The CUP 85 is further connected to the printer 43 and touch panel 41. The image processed still image may be printed out as a photograph by outputting the still image together with a print command to the printer 43 from the CPU 85. Further, the CPU 85 receives an operational instruction from the touch panel 41, and performs processing according to the operational instruction given by the user.

The CPU 85 is further connected to a ROM (Read Only Memory) 87. The ROM 87 stores at least a plurality of image processing programs and requirement specifications of identification photographs. The requirement specifications include information related at least to the size of the photograph to be printed, the size and location of the head in the photograph. The CPU 85 accesses the ROM 87 to read the programs and requirement specifications of identification photographs as required, and performs image processing on the still image fetched from the memory 84 in order to provide a photograph that conforms to the requirement specifications.

In this way, in the present invention, the digital camera 24 has a wide field angle α to ensure a wide imaging range. This may eliminate the eye line adjustment of the user 14, and allows a simplified structure for the camera 24. In the mean time, a larger image may be obtained. Although the region to be used for an identification photograph like the conventional imaging range is not identified, this problem is solved by the head detecting function.

The CPU 85 determines if fingerprint data obtained by the fingerprint obtaining section 40 are applicable to fingerprint authentication. When the data are determined to be applicable to fingerprint authentication, it stores the data in the memory 84 as fingerprint authentication data. The CUP 85 also determines if fingerprint data obtained by the fingerprint obtaining section 40 match the fingerprint authentication data. The fingerprint authentication and face image obtaining steps are detailed in the flowchart described below.

Figure 5:
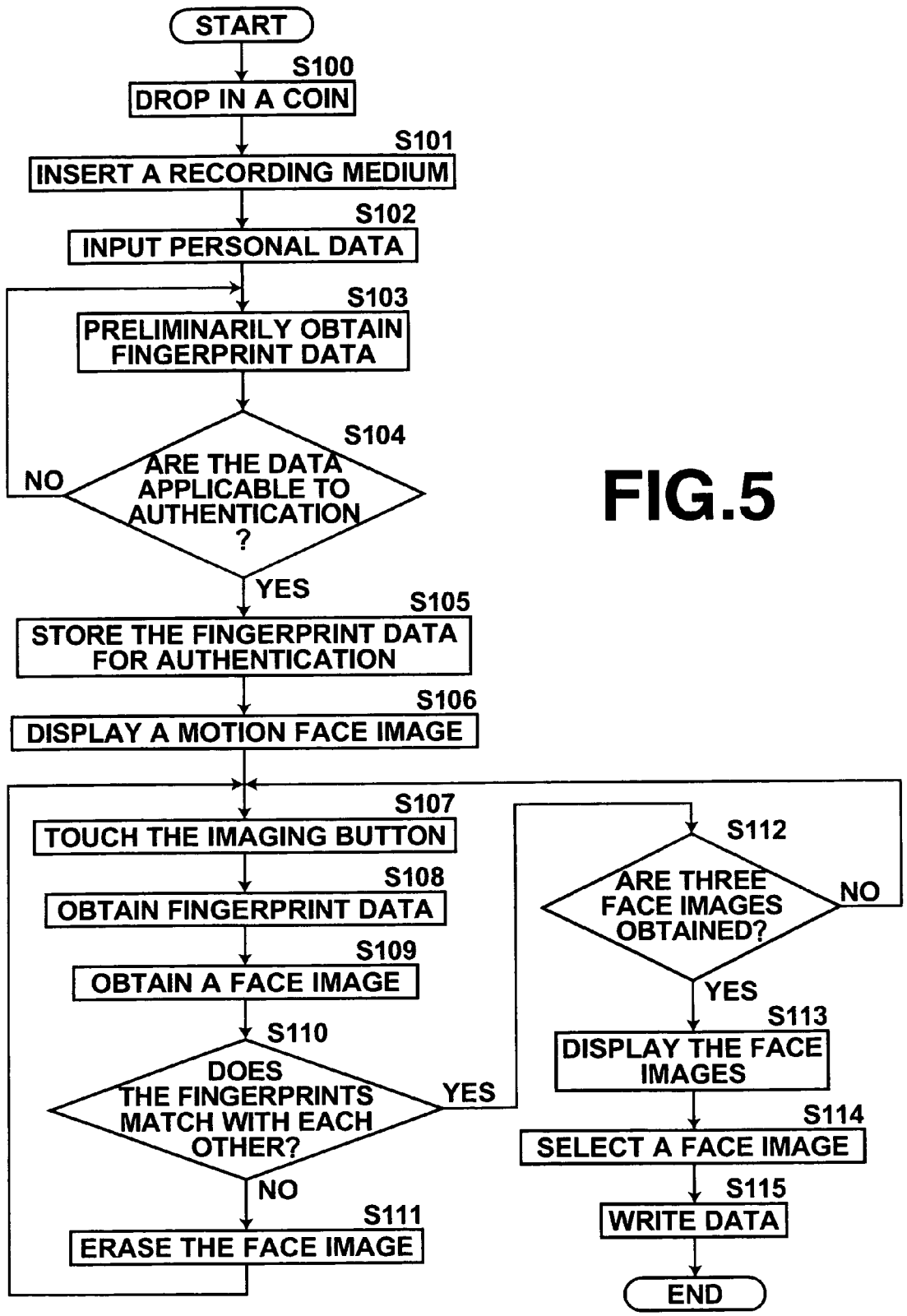
FIG. 5 is a flowchart for explaining the operation of the face image obtaining apparatus shown in FIG. 1.

The operation of the face image obtaining apparatus 10 of the present invention constructed in the manner as described above will now be described. FIG. 5 is a flowchart for explaining the operational process of the face image obtaining apparatus 10 of the present invention. Each step is prompted by the voice message from the speaker 29. First, the user 14 drops in a coin (Step 100). This activates the face image obtaining apparatus 10. Then, a recording medium 51 is inserted into the slot 52 of the card writer 42 (Step 101). Thereafter, personal data, such as the user name, resident resister code number, and the like, are inputted from the touch panel 41 displaying the information entry screen (keyboard) (Step 102). Then, fingerprint digital data are preliminarily obtained from the right and left forefingers of the user by the fingerprint obtaining section 40 (Step 103). The controller 33 extracts minutia points from these fingerprint data, and determines if sufficient minutia points required for the fingerprint authentication are obtained, i.e., if these fingerprint data are applicable to the fingerprint authentication (Step 104). If these fingerprint data are determined not to be applicable to the fingerprint authentication, the operational process returns to the Step 103, and prompts the user to obtain the digital fingerprint data again. If these fingerprint data are determined to be applicable to the fingerprint authentication, the operational process proceeds to the Step 105, and these fingerprint data are stored in the memory 84 of the controller 33 as fingerprint authentication data.

Thereafter, a motion face image of the user performing image taking using the digital camera 24 is displayed on the CRT display 26 by video through (Step 106). Here, the touch panel 41 is switched to the operation entry screen. By observing the own face image displayed on the CRT display 26, the user touches the imaging button 48 at a desired timing (Step 107). The action of imaging instruction described above activates the fingerprint obtaining section 50 built in the imaging button 48, and thereby fingerprint data of the user are obtained (Step 108). At the same time, a still image of the face is obtained by the digital camera 24, which is stored in the memory 84 of the controller 33 as the face image data (Step 109). Further, the controller 33 compares the minutia points of the fingerprint data obtained by the action of the imaging instruction with the minutia points of the stored fingerprint authentication data (Step 110). If the minutia points of the fingerprint data obtained by the action of imaging instruction match neither the minutia points of the stored right fingerprint data nor the minutia points of the stored left fingerprint data, the face image stored in the memory 84 is erased (Step 111), and the operational process returns to Step 107 to prompt the user to touch the imaging button 48 again. If the minutia points match with each other, the operational process proceeds to step 112. If face image data are stored but erased immediately afterward as in step 111, it is not included in the scope of "obtaining and storing face image data" of the present invention.

In Step 112, determination is made if three face images are stored in the memory 84. If negative, the operational process returns to Step 107 to prompt the user to touch the imaging button 48 again, and if positive, the operational process proceeds to Step 113 to display the three face images on the CRT display 26. The user selects a preferred face image through the selection button 49 in Step 114.

In Step 115, the controller 33 relates the face image data selected in Step 114, fingerprint authentication data, personal data, such as the user name, resident resister code number or passport number, and the like, to the unique identification number of the face image obtaining apparatus 10, and date and time of imaging, and records on the recording medium 51 inserted in the slot 52 of the card writer 42.

These data may be transferred to a predetermined place, for example, to the management center 66 through the communication line 62, or printed out if so requested by the user.

As evident from the description above, in the face image obtaining apparatus 10 according to the first embodiment of the present invention, the following are performed: preliminarily obtaining fingerprint data of the user; determining whether the fingerprint data are applicable to fingerprint authentication; storing the fingerprint data as fingerprint authentication data if the fingerprint data are determined to be applicable to fingerprint authentication; obtaining fingerprint data and still image data of the user through the touching of the imaging button 48 of the touch panel 41 by the user; and storing the still image data if the fingerprint data obtained when the user touched the imaging button 48 match the fingerprint authentication data. This allows fingerprint data applicable to fingerprint authentication to be stored as the fingerprint authentication data without fail. Further, the simple touching of the imaging button by the user allows the face image data to be obtained, and the fingerprint authentication to be implemented when obtaining the face image data. This prevents the counterfeiting user switching without increasing the burden on the user.

Hereinafter, the face image obtaining apparatus 11 according to a second embodiment will be described with reference to FIG. 6. The face image obtaining apparatus 11 makes use of voiceprint instead of fingerprint. The elements identical to those shown in FIG. 1 are given the same reference numerals, and will not be elaborated upon further here unless otherwise specifically required.

Figure 6:
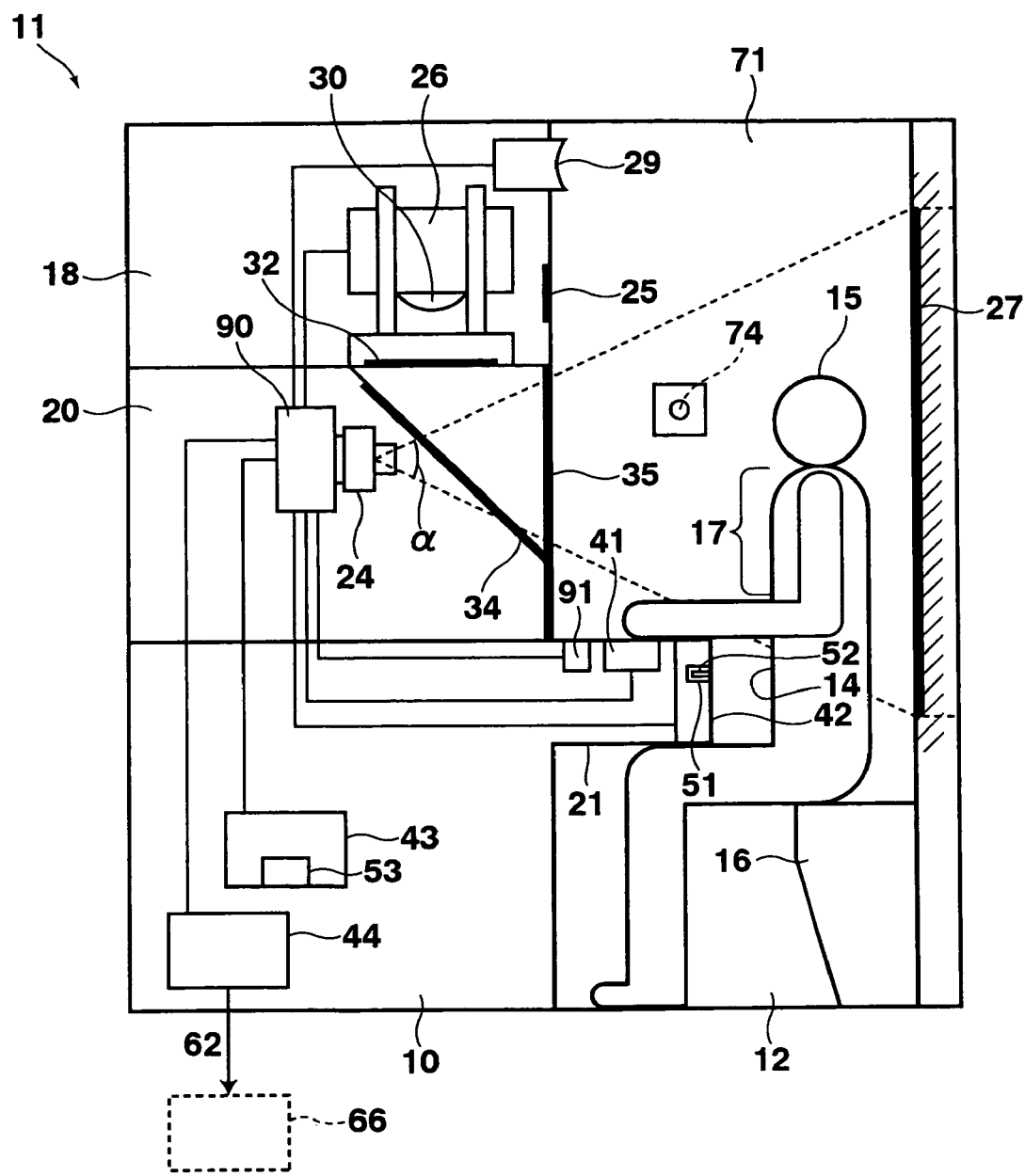
FIG. 6 is a schematic diagram of the face image obtaining apparatus according to a second embodiment of the present invention.

As shown in FIG. 6, the face image obtaining apparatus 11 includes a controller 90 having a voice recognition function, and a voiceprint obtaining and authentication function; and a microphone 91. Other functions of the controller 90 are identical to those of the controller 33. The controller 90 further has a function to determine if a voiceprint applicable to voiceprint authentication is available from the speech inputted to the microphone 91.

Each operation step is prompted by the voice message from the speaker 29. After dropping in a coin and registering the personal data, the user 14 registers a voiceprint for authentication. When registering the voiceprint, the user utters speech, saying, for example, "shooting". The controller 90 determines if a voiceprint applicable to the voiceprint authentication is included in the speech, and if included, the voiceprint included in the speech is stored as voiceprint authentication data. If a voiceprint applicable to the voiceprint authentication is not included in the speech, reentry of the speech is prompted.

After the voiceprint authentication data are stored, a motion face image of the user performing image taking using the digital camera 24 is displayed on the CRT display 26 by video through. By observing the own face image displayed on the CRT display 26, the user utters speech, saying "shooting" at a desired timing to the microphone 91. The controller 90 obtains the voiceprint of the user through the action of instruction for imaging by the user described above. At the same time, a still image of the face is obtained by the digital camera 24, which is stored in the memory 84 of the controller 90 as face image data. Further, the controller 90 compares the voiceprint obtained through the action of the imaging instruction by the user with the stored voiceprint. If the two voiceprints match with each other, the face image data are stored, and if not, the face image data are erased. Through the operation performed in the manner as described above, three face images are stored, which are then displayed on the CRT display 26 and a preferred face image is selected by the user through voice instruction or depression of a selection button.

As evident from the description above, in the face image obtaining apparatus 11 according to the second embodiment of the present invention, the following are performed: preliminarily obtaining voiceprint data of the user; determining whether the obtained voiceprint data are applicable to voiceprint authentication; storing the voiceprint as the voiceprint authentication data if the voiceprint data are determined to be applicable to voice print authentication; obtaining voiceprint data and still image data of the user when the user utters speech, saying "shooting"; and storing the still image data if the voiceprint data obtained when the user uttered speech of instruction for imaging match the voiceprint authentication data. This allows voiceprint data applicable to voiceprint authentication to be stored as the voiceprint authentication data without fail. Further, the simple utterance of speech by the user, saying "shooting" allows the face image data to be obtained, and the voiceprint authentication to be implemented when obtaining the face image data. This prevents the counterfeiting user switching without increasing the burden on the user. Preferably, the face image recording is implemented when the facial expression of the user has settled after the utterance of speech by the user.

Further, in the embodiments described above, the biometric authentication is implemented after still image is obtained. But the present invention is not limited to this. For example, the acquisition of the still image and biometric authentication may be implemented at the same time. Alternatively, the biometric authentication may be implemented first, if it is implemented in a short time. When the biometric authentication is implemented first, the operational process may return to data reentry step for recording if the obtained biological data do not match the authentication biological data without obtaining the still image. When the biological data are, for example, fingerprint data, the biological data to be stored may be an image or minutia points of the fingerprint. That is, the biological data to be stored may be any form of data as long as the data are applicable to biometric authentication.

What is claimed is:

1. A face image obtaining method, comprising the steps of:
   preliminarily obtaining at least one of finger-related biological information, hand-related biological information, and voiceprint as biological information of a user by a biological information preliminarily obtaining means;
   determining whether the biological information is applicable to biometric authentication by a biological information determining means;
   storing the biological information as biometric authentication information by a biological information storing means if the biological information is determined to be applicable to biometric authentication;
   obtaining the biological information and a face image of the user through inputting action of the user by using an input means for obtaining the face image thereof; and
   storing the face image of the user by a face image storing means if the biological information obtained through the inputting action of the user matches the biometric authentication information.

2. The face image obtaining method according to claim 1, wherein the biological information is a fingerprint, and the input means has a fingerprint obtaining function.

3. The face image obtaining method according to claim 1, wherein the biological information is a voice print, and the input means has a voiceprint obtaining function.

4. A face image obtaining apparatus, comprising:
   a biological information preliminarily obtaining means for preliminarily obtaining at least one of finger-related biological information, hand-related biological information, and voiceprint as biological information of a user;
   a biological information determining means for determining whether the biological information obtained by the biological information preliminarily obtaining means is applicable to biometric authentication;
   a biological information storing means for storing the biological information as biometric authentication information if the biological information is determined to be applicable to biometric authentication by the biological information determining means;
   a face image obtaining means for obtaining a face image of the user;
   an input means utilized for obtaining a face image of the user by the face image obtaining means, wherein the input means is capable of obtaining the biological information of the user through inputting action of the user for obtaining a face image thereof; and
   a face image storing means for storing the face image of the user obtained by the face image obtaining means if the biological information obtained through the inputting action of the user matches the biometric authentication information.

5. The face image obtaining apparatus according to claim 4, wherein the biological information is a fingerprint, and the input means has a fingerprint obtaining function.

6. The face image obtaining apparatus according to claim 4, wherein the biological information is a voiceprint, and the input means has a voiceprint obtaining function.

* * * * *